(12) United States Patent
Zeng

(10) Patent No.: US 9,835,784 B2
(45) Date of Patent: Dec. 5, 2017

(54) ILLUMINATING DEVICE COMPRISING QUANTUM DOT TUBE, BACKLIGHT MODULE, AND LCD

(71) Applicant: Wuhan China Star Optoelectronics Technology Co., Ltd., Wuhan, Hubei (CN)

(72) Inventor: Jie Zeng, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 128 days.

(21) Appl. No.: 14/890,231

(22) PCT Filed: Jul. 10, 2015

(86) PCT No.: PCT/CN2015/083741
§ 371 (c)(1),
(2) Date: Nov. 10, 2015

(87) PCT Pub. No.: WO2016/201749
PCT Pub. Date: Dec. 22, 2016

(65) Prior Publication Data
US 2017/0168213 A1   Jun. 15, 2017

(30) Foreign Application Priority Data

Jun. 19, 2015   (CN) .......................... 2015 1 0346960

(51) Int. Cl.
*F21V 7/04*   (2006.01)
*F21V 8/00*   (2006.01)

(52) U.S. Cl.
CPC ........... *G02B 6/0016* (2013.01); *G02B 6/005* (2013.01); *G02B 6/009* (2013.01); *G02B 6/0055* (2013.01); *G02B 6/0083* (2013.01)

(58) Field of Classification Search
CPC .... G02B 6/0016; G02B 6/005; G02B 6/0055; G02B 6/0083; G02B 6/009; G02B 6/0026; G02B 6/0021; G02B 6/003
See application file for complete search history.

(56) References Cited

U.S. PATENT DOCUMENTS 7,637,646 B2   12/2009   Byun et al.
8,294,168 B2 *  10/2012   Park .................... H01L 25/0753
                                              257/98

(Continued)

FOREIGN PATENT DOCUMENTS

CN   201496844 U   6/2010
CN   102798048 A   11/2012

(Continued)

*Primary Examiner* — Elmito Breval
*Assistant Examiner* — Naomi M Wolford
(74) *Attorney, Agent, or Firm* — Andrew C. Cheng; Tom Abeles

(57) ABSTRACT

The present invention proposes an illuminating device having a quantum dot tube. The illuminating device includes: a transparent tubular encapsulation device including a light incident surface and a light emergent surface and a quantum dot. Bumps and grooves are disposed on the light incident surface and/or the emergent surface at intervals. The quantum dot is encapsulated in the transparent tubular encapsulation device. When an excitement light shines the quantum dot, the quantum dot is excited to emit light through the light incident surface. By using the illuminating device, light cannot leak from the gaps among the LEDs and the QDs and among the QDs and the LGPs, which is good for enhancing light availability. Additionally, the present invention also proposes a backlight module and a liquid crystal display using the illuminating device having the quantum dot tube.

13 Claims, 2 Drawing Sheets

(56) References Cited

U.S. PATENT DOCUMENTS

| | | | |
|---|---|---|---|
| 9,074,748 B2 | 7/2015 | Yang et al. | |
| 9,239,419 B2 | 1/2016 | Yan | |
| 2010/0271844 A1 | 10/2010 | Wang et al. | |
| 2011/0267841 A1* | 11/2011 | Lee | G02B 6/003 362/613 |
| 2012/0050649 A1* | 3/2012 | Yeo | G02B 6/002 349/65 |
| 2014/0056024 A1 | 2/2014 | Kim et al. | |
| 2015/0103291 A1 | 4/2015 | Li | |
| 2016/0091657 A1 | 3/2016 | Yang et al. | |

FOREIGN PATENT DOCUMENTS

| | | |
|---|---|---|
| CN | 103217733 A | 7/2013 |
| CN | 104456207 A | 3/2015 |
| JP | 2007265788 A | 10/2007 |
| JP | 2011242641 A | 12/2011 |

\* cited by examiner

ILLUMINATING DEVICE COMPRISING QUANTUM DOT TUBE, BACKLIGHT MODULE, AND LCD

BACKGROUND OF THE INVENTION

1. Field of the Invention

The present invention relates to the field of liquid crystal display (LCD), and more particularly, to an illuminating device comprising a quantum dot (QD) tube, a backlight module, and an LCD.

2. Description of the Prior Art

After being shone by an external light source such as light emitting diodes (LEDs), QDs are excited to emit pure light with high chromaticity. The characteristic of illumination is far beyond the characteristic of illumination of phosphor powder for the LED backlight. Therefore, QD tubes where the QDs are encapsulated are widely used in the field of LCDs.

Nowadays, QD tubes are usually arranged on an area between a plurality of LEDs and a plurality of light guide plates (LGPs) in the conventional LCD. However, light easily leaks from gaps arranged among the LEDs and the QD tubes and from gaps arranged among the QD tubes and the LGPs, which results in low light availability.

SUMMARY OF THE INVENTION

An object of the present invention is to propose an illuminating device comprising a QD tube, a backlight module, and an LCD for enhancing light availability.

According to the present invention, a backlight module comprises an illuminating device comprising a quantum dot tube, a plurality of light emitting diodes (LEDs), and a light guide plate. The illuminating device comprises a transparent tubular encapsulation device and a quantum dot encapsulated in the transparent tubular encapsulation device. The transparent tubular encapsulation device comprises a light incident surface and a light emergent surface. A plurality of bumps and a plurality of grooves are disposed on one surface of the light incident surface at intervals. Each of the plurality of LEDs being arranged in the groove is arranged between any two of the adjacent bumps in the light incident surface of the illuminating device tube. The light guide plate comprises a light incident side. The light incident side of the light guide plate and the light emergent surface of the illuminating device tube are arranged opposite to each other. A plurality of bumps and a plurality of grooves are disposed on one surface of the light emergent surface at intervals. A plurality of protrusions and a plurality of recesses are disposed on the light incident side of the light guide plate. Each of the plurality of protrusions disposed on the light incident side of the light guide plate is disposed on the groove arranged between any two of the adjacent bumps on the light emergent surface of the illuminating device tube. The shape of the groove in the light incident surface of the illuminating device matches the shape of the accommodated LED.

Furthermore, the backlight module further comprises a plastic frame, installed on the LED, the illuminating device tube, and an external area of the light guide plate.

Furthermore, the backlight module further comprises a reflector, arranged on a bottom of the light guide plate.

Furthermore, the backlight module further comprises a flexible printed circuit, arranged on a top side of the plurality of LED.

Furthermore, the groove on the light incident surface in the transparent tubular encapsulation device and the groove on the light emergent surface in the transparent tubular encapsulation device are shaped like a square.

Furthermore, the backlight module further comprises at least one optical film, arranged on a top side of the light guide plate.

According to the present invention, a backlight module comprises an illuminating device comprising a quantum dot tube, a plurality of light emitting diodes (LEDs), and a light guide plate. The illuminating device comprises a transparent tubular encapsulation device and a quantum dot encapsulated in the transparent tubular encapsulation device. The transparent tubular encapsulation device comprises a light incident surface and a light emergent surface. A plurality of bumps and a plurality of grooves are disposed on one surface of the light incident surface at intervals. Each of the plurality of LEDs being arranged in the groove is arranged between any two of the adjacent bumps in the light incident surface of the illuminating device tube. The light guide plate comprises a light incident side. The light incident side of the light guide plate and the light emergent surface of the illuminating device tube are arranged opposite to each other.

Furthermore, a plurality of bumps and a plurality of grooves are disposed on one surface of the light emergent surface at intervals. A plurality of protrusions and a plurality of recesses are disposed on the light incident side of the light guide plate. Each of the plurality of protrusions disposed on the light incident side of the light guide plate is disposed on the groove arranged between any two of the adjacent bumps on the light emergent surface of the illuminating device tube.

Furthermore, the backlight module further comprises a plastic frame, installed on the LED, the illuminating device tube, and an external area of the light guide plate.

Furthermore, the backlight module further comprises a reflector, arranged on a bottom of the light guide plate.

Furthermore, the shape of the groove in the light incident surface of the illuminating device matches the shape of the accommodated LED.

Furthermore, the backlight module further comprises a flexible printed circuit, arranged on a top side of the plurality of LED.

Furthermore, the groove on the light incident surface in the transparent tubular encapsulation device and the groove on the light emergent surface in the transparent tubular encapsulation device are shaped like a square.

Furthermore, the backlight module further comprises at least one optical film, arranged on a top side of the light guide plate.

According to the present invention, an illuminating device comprising a quantum dot tube, comprises a transparent tubular encapsulation device and a quantum dot. The transparent tubular encapsulation device comprises a light incident surface and a light emergent surface. A plurality of bumps and a plurality of grooves being disposed on the light incident surface and/or the emergent surface at intervals. The quantum dot is encapsulated in the transparent tubular encapsulation device. When an excitement light shines the quantum dot, the quantum dot is excited to emit light through the light incident surface.

Compared with the conventional technology, the illuminating device comprising a QD tube comprises a transparent tubular encapsulation device in the present invention. A plurality of bumps and a plurality of grooves are disposed on one surface of the light incident surface and/or one surface of the light emergent surface at intervals. The plurality of LEDs are arranged in the groove located between any two adjacent bumps in the light incident surface of the illuminating device comprising a QD tube. Also, the light incident surface of the LGP and the light emergent surface of the illuminating device comprising a QD tube are arranged opposite to each other. Owing to the method for applying the illuminating device comprising a QD tube to the LCD, the light incident surface and the light emergent surface can tightly match the LED and the LGP, respectively. In this way, light cannot leak from the gaps among the LEDs and the QDs and among the QDs and the LGPs, which is good for enhancing light availability.

DETAILED DESCRIPTION OF THE PREFERRED EMBODIMENTS

The drawings illustrate embodiments of the invention and, together with the description, serve to explain the principles of the invention.

Figure 1:
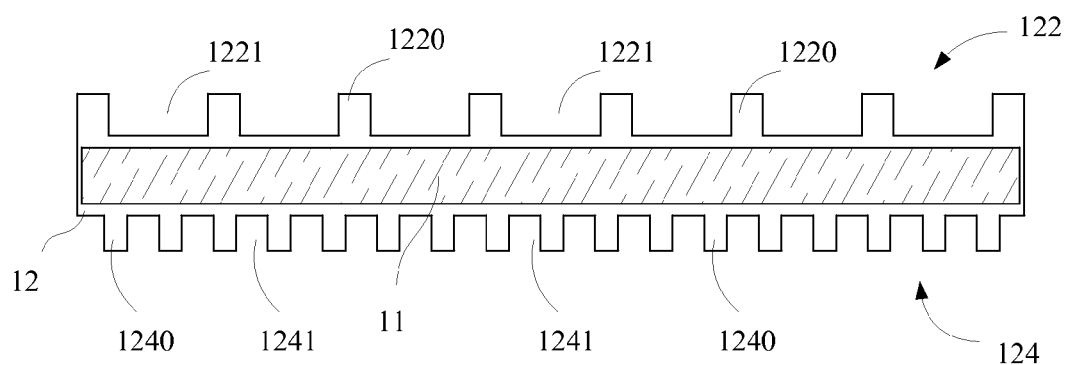
FIG. 1 is a top view of an illuminating device comprising a QD tube according to one embodiment of the present invention.

Please refer to FIG. 1. FIG. 1 is a top view of an illuminating device comprising a QD tube 10 according to one embodiment of the present invention. The illuminating device comprising a QD tube 10 comprises a QD 11 and a transparent tubular encapsulation device 12.

The QD 11 is encapsulated in the transparent tubular encapsulation device 12. The QD 11 is a nanometer particle made of Group II-VI elements and Group III-V elements. The particle diameter of the QD 11 is usually smaller than or equal to 10 nm. Because electrons and holes are controlled by quantum confinement, a continuous electronic band structure is converted into a separate electronic band structure. After being excited, the QD 11 emits fluorescence.

The transparent tubular encapsulation device 12 comprises a light incident surface 122 and a light emergent surface 124. A plurality of bumps and a plurality of grooves are disposed on one surface of the light incident surface 122 and/or one surface of the light emergent surface 124 at intervals. A plurality of bumps 1220 and a plurality of grooves 1221 are disposed on one surface of the light incident surface 122 at intervals. A plurality of bumps 1240 and a plurality of grooves 1241 are disposed on one surface of the light emergent surface 124 at intervals. The light incident surface 122 is a surface of the transparent tubular encapsulation device 12 and is used for receiving an excitement light when the excitement light shines on the transparent tubular encapsulation device 12. The light emergent surface 124 is a surface where the light emitted by the QD 11 shines out after the excitement light enters the transparent tubular encapsulation device 12 from light incident surface 122, shines on the QD 11, and excites the QD 11 to give off light.

It is possible that the groove and the bump are arranged on one side of the illuminating device comprising a QD tube 10 only in another embodiment. For example, a plurality of bumps 1220 and a plurality of grooves 1221 are disposed on one surface of the light incident surface 122 for accommodating the LEDs so as to enhance light availability and color gamut. The light emergent surface 124 butts the LGP in a conventional way. Or, a plurality of bumps 1240 and a plurality of grooves 1241 are disposed on one surface of the light emergent surface 124 at intervals.

Compared with the conventional technology, the illuminating device comprising a QD tube comprises a transparent tubular encapsulation device in this embodiment. A plurality of bumps and a plurality of grooves are disposed on one surface of the light incident surface and/or one surface of the light emergent surface at intervals. The QD is encapsulated in the transparent tubular encapsulation device. Owing to the method for applying the illuminating device comprising a QD tube to the LCD, the light incident surface and the light emergent surface can tightly match the LED and the LGP, respectively. In this way, light cannot leak from the gaps between the LED and the QD and between the QD and the LGP, which is good for enhancing light availability. Such a method makes the light emitted by the LED well-distributed; further, the light excited by the illuminating device comprising a QD tube becomes well-distributed, thereby effectively preventing patterns with alternations of brightness and darkness shown on the LCD. In addition, a plurality of bumps and a plurality of grooves are disposed on one surface of the light incident surface and/or the light emergent surface of the transparent tubular encapsulation device at intervals. So the surfaces of the light incident surface and the light emergent surface become uneven, which produces different emission effects when different light sources emit.

The groove 1221 on the light incident surface 122 in the transparent tubular encapsulation device 12 is shaped like a square. Owing to the shape of the groove 1221, the LED can be accommodated in the groove 1221 without difficulties in the LCD. The shape of the groove 1221 in the light incident surface 122 of the illuminating device comprising a QD tube 10 matches the shape of the accommodated LED.

The groove 1241 on the light emergent surface 124 in the transparent tubular encapsulation device 12 can be square as well. When the groove 1241 is used in the LCD, the shape of the groove 1241 can firmly match the square bump on the LGP 30.

Preferably, the groove 1221 on the light incident surface 122 is larger than the groove 1241 on the light emergent surface 124.

The shape of the groove 1221 of the light incident surface 122 is not limited to the square described above. Instead, the groove 1221 can be arbitrarily shaped as long as the groove 1221 matches the LED so that the LED can be fitted into the groove 1221 exactly. It is perfect that the shape of the groove 1221 matches the shape of the LED for fitting the gaps among the plurality of LEDs fully. Most likely, light does not pass through the gaps among the plurality of LEDs.

The shape of the groove 1241 of the light emergent surface 124 is not limited to the square described above. Instead, the groove 1241 can be arbitrarily shaped as long as the groove 1241 can attach to the LGP more firmly. Further, for example, the light emergent surface 124 matches the microstructure of the surface of the LGP.

The size of the grooves 1221 and 1241 and the size of the bumps 1220 and 1240 are not confined to what is described above. Actually, the size of the grooves 1221 and 1241 and the size of the bumps 1220 and 1240 on the light incident surface 122 and on the light emergent surface 124 are adjusted one by one or totally based on real demand or the effect of assembly of the backlight module.

The QD 10 encapsulated in transparent tubular encapsulation device 12 can be a mixture of one or more than two substances with a diameter smaller than or equal to 10 nm. QDs with different diameters make lights show different colors in transparent tubular encapsulation device 12 once being shone by the same exciting light.

Contrast to the conventional technology, the feature of the present embodiment is that the proposed illuminating device comprising a QD tube comprises a groove and a bump arranged on the surface. In addition to the enhancement of the light availability, the illuminating device comprising a QD tube can be firmly pasted on the LED and the LGP without using the mechanical device such as a double-sided adhesive tape and a hook. Color gamut is also enhanced after the external light source enters the illuminating device comprising a QD tube where the QD is changed. The formed backlight Color gamut is also enhanced obviously after the illuminating device comprising a QD tube is applied to the LCD. Further, the Color gamut of the LCD is enhanced. the color shown by the LCD becomes rich and bright.

Figure 2:
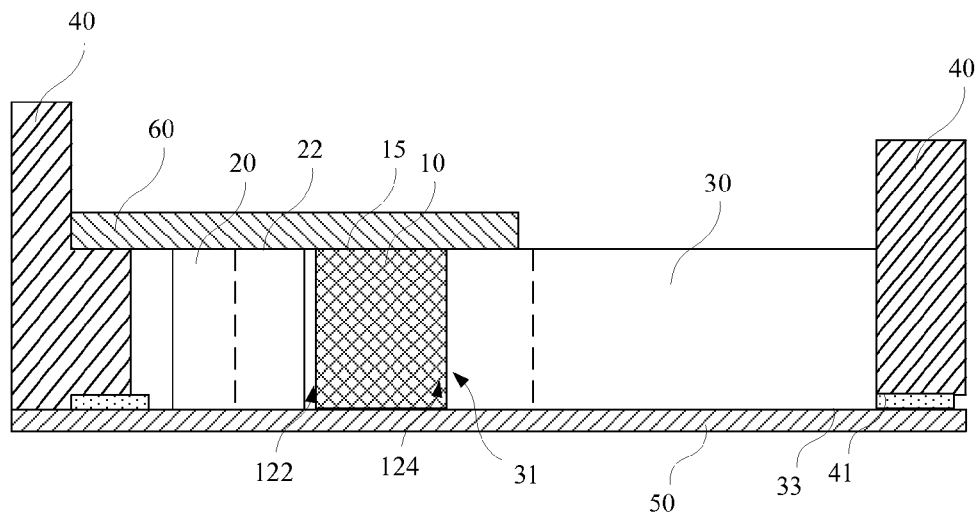
FIG. 2 shows a top view of a backlight module according to a first preferred embodiment of the present invention.
Figure 3:
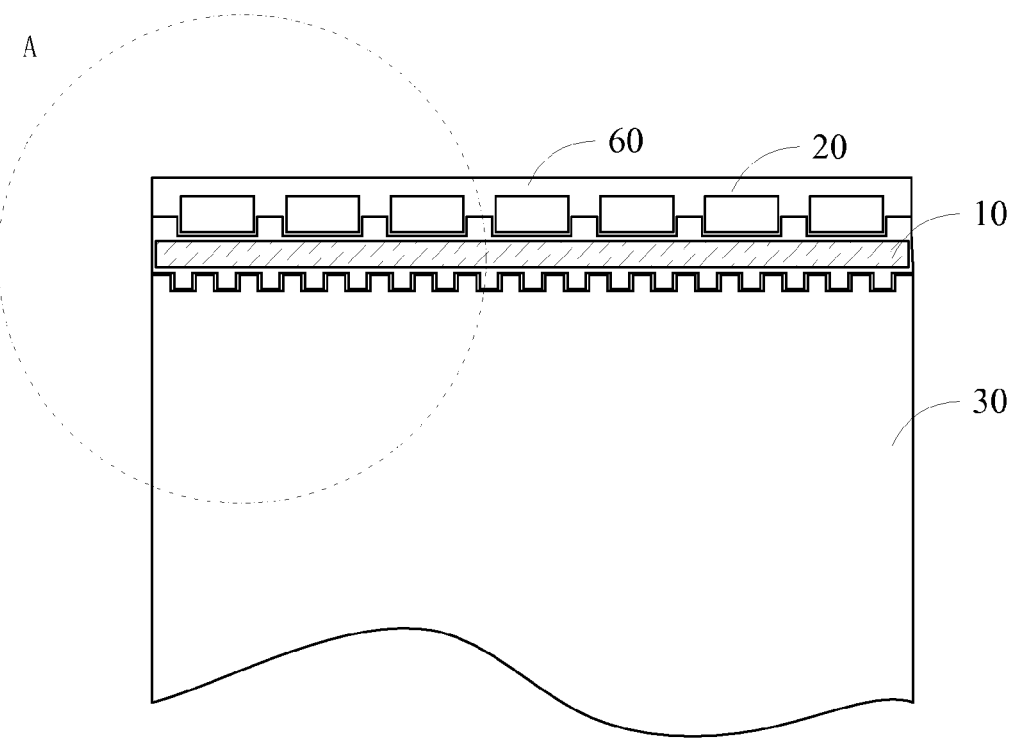
FIG. 3 shows a top view of a backlight module according to a second preferred embodiment of the present invention.
Figure 4:
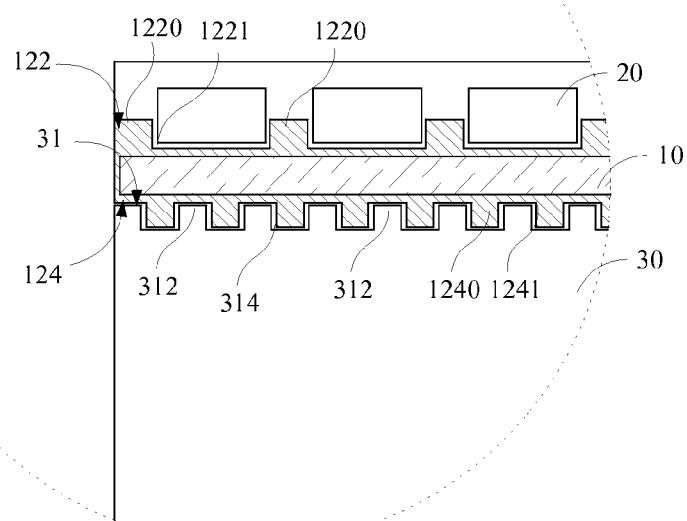
FIG. 4 shows an enlargement of an area A marked in FIG. 3.

Please refer to FIG. 2 to FIG. 4. The backlight module 100 comprises an illuminating device comprising a QD tube 10, a plurality of LEDs 20, and an LGP 30.

The illuminating device comprising a QD tube 10 is used here just as what is described above so no further description for the illuminating device comprising a QD tube 10.

Each of the plurality of LEDs 20 is arranged in the groove 1221 located between any two adjacent bumps 1220 in the light incident surface 122 of the illuminating device comprising a QD tube 10.

The LGP 30 comprises a light incident side 31. The light incident side 31 corresponds to the light emergent surface 124 of the illuminating device comprising a QD tube 10.

A plurality of protrusions 312 and a plurality of recesses 314 are disposed on the light incident side 31 of the LGP 30. Each of the plurality of protrusions 312 are disposed on the recess 314 located between any two adjacent protrusions 312 on the light emergent surface 124 of the illuminating device comprising a QD tube 10. The LGP 30 is used for converting a point light source or a line light source emitted by the illuminating device comprising a QD tube 10 and the LED 20 into an area (surface) light source. The LGP 30 is fabricated from any conventional materials for conventional LGPs such as optical acrylic.

The backlight module 100 further comprises a plastic frame 40. The plastic frame 40 is installed on the plurality of LEDs 20, the illuminating device comprising a QD tube 10, and an external area oft the LGP 30 for supporting and protecting the illuminating device comprising a QD tube 10, the plurality of LEDs 20, and the LGP 30.

The backlight module 100 further comprises a reflector 50. The reflector 50 is arranged on a bottom 33 of the LGP 30.

The reflector 50 is pasted on the bottom 41 of the plastic frame 40 and/or on the bottom 33 of the LGP 30 using a paste technique. The paste technique refers to means of pasting two different objects together with sticky material. The paste technique comprises (but is not limited to) to means of coating a glue layer or pasting a double-sided adhesive tape.

The backlight module 100 further comprises a flexible printed circuit (FPC) 60. The FPC 60 is arranged on a top side 22 of the plurality of LED 20. The FPC 60 can be fabricated from polyimide (PI) or polyester film; however, the FPC 60 is not limited to be fabricated from these materials.

The FPC 60 is arranged on the top side 22 of the plurality of LED 20 and a top side 15 of the illuminating device comprising a QD tube 10.

The backlight module 100 further comprises at least one optical film (not shown). The at least one optical film is arranged on the top side of the LGP 30.

Compared with the conventional technology, a backlight module comprises an illuminating device comprising a QD tube in this embodiment. The illuminating device comprising a QD tube comprises a transparent tubular encapsulation device in the present invention. A plurality of bumps and a plurality of grooves are disposed on one surface of the light incident surface and/or the light emergent surface at intervals. The QD is encapsulated in the transparent tubular encapsulation device. The plurality of LEDs are arranged in the groove located between any two adjacent bumps in the light incident surface of the illuminating device comprising a QD tube. Correspondingly, a plurality of bumps and a plurality of grooves are disposed on the light incident surface of the LGP opposite to the light emergent surface of the transparent tubular encapsulation device. Each of the plurality of bumps of the light incident surface is disposed on the groove between any two adjacent bumps in the light emergent surface of the illuminating device comprising a QD tube.

Owing to the method for applying the illuminating device comprising a QD tube to the LCD, the light incident surface and the light emergent surface can tightly match the LED and the LGP, respectively. In this way, light cannot leak from the gaps among the LEDs and the QDs and among the QDs and the LGPs, which is good for enhancing light availability. Such a method makes the light emitted by the LED well-distributed; further, the light excited by the illuminating device comprising a QD tube becomes well-distributed, thereby effectively preventing patterns with alternations of brightness and darkness shown on the LCD. In addition, a plurality of bumps and a plurality of grooves are disposed on one surface of the light incident surface and the light emergent surface of the transparent tubular encapsulation device at intervals. So the surfaces of the light incident surface and the light emergent surface become uneven, which produces different emission effects when different light sources emit. Color gamut is also enhanced after the external light source enters the illuminating device comprising a QD tube where the QD is changed. The formed backlight Color gamut is also enhanced obviously after the illuminating device comprising a QD tube is applied to the LCD. Further, the Color gamut of the LCD is enhanced. the color shown by the LCD becomes colorful and bright.

The present invention also provides a liquid crystal display comprising any one of the backlight module as mentioned above.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:
1. A backlight module, comprising:
   an illuminating device comprising a quantum dot tube, comprising a transparent tubular encapsulation device and a quantum dot encapsulated in the transparent tubular encapsulation device, the transparent tubular encapsulation device comprising a light incident surface and a light emergent surface, and a plurality of bumps and a plurality of grooves being disposed on one surface of the light incident surface at intervals;

a plurality of light emitting diodes (LEDs), each of the plurality of LEDs being arranged in the groove arranged between any two of the adjacent bumps in the light incident surface of the illuminating device tube;

a light guide plate, comprising a light incident side, the light incident side of the light guide plate and the light emergent surface of the illuminating device tube arranged opposite to each other;

wherein a plurality of bumps and a plurality of grooves are disposed on one surface of the light emergent surface at intervals;

a plurality of protrusions and a plurality of recesses are disposed on the light incident side of the light guide plate, and each of the plurality of protrusions disposed on the light incident side of the light guide plate is disposed on the groove arranged between any two of the adjacent bumps on the light emergent surface of the illuminating device tube;

the shape of the groove in the light incident surface of the illuminating device matches the shape of the accommodated LED.

2. The backlight module of claim 1, further comprising:
a plastic frame, installed on the LED, the illuminating device tube, and an external area of the light guide plate.

3. The backlight module of claim 1, further comprising:
a reflector, arranged on a bottom of the light guide plate.

4. The backlight module of claim 1, further comprising:
a flexible printed circuit, arranged on a top side of the plurality of LED.

5. The backlight module of claim 1, wherein the groove on the light incident surface in the transparent tubular encapsulation device and the groove on the light emergent surface in the transparent tubular encapsulation device are shaped like a square.

6. The backlight module of claim 1, further comprising:
at least one optical film, arranged on a top side of the light guide plate.

7. A backlight module, comprising:
an illuminating device comprising a quantum dot tube, comprising a transparent tubular encapsulation device and a quantum dot encapsulated in the transparent tubular encapsulation device, the transparent tubular encapsulation device comprising a light incident surface and a light emergent surface, and a plurality of bumps and a plurality of grooves being disposed on one surface of the light incident surface at intervals;

a plurality of light emitting diodes (LEDs), each of the plurality of LEDs being arranged in the groove arranged between any two of the adjacent bumps in the light incident surface of the illuminating device tube; and a light guide plate, comprising a light incident side, the light incident side of the light guide plate and the light emergent surface of the illuminating device tube arranged opposite to each other, wherein a plurality of bumps and a plurality of grooves are disposed on one surface of the light emergent surface at intervals;

a plurality of protrusions and a plurality of recesses are disposed on the light incident side of the light guide plate, and each of the plurality of protrusions disposed on the light incident side of the light guide plate is disposed on the groove arranged between any two of the adjacent bumps on the light emergent surface of the illuminating device.

8. The backlight module of claim 7, further comprising:
a plastic frame, installed on the LEDs, the illuminating device tube, and an external area of the light guide plate.

9. The backlight module of claim 7, further comprising:
a reflector, arranged on a bottom of the light guide plate.

10. The backlight module of claim 7, wherein the shape of the groove in the light incident surface of the illuminating device matching the shape of the accommodated LED.

11. The backlight module of claim 7, further comprising:
a flexible printed circuit, arranged on a top side of the plurality of LEDs.

12. The backlight module of claim 7, wherein the groove on the light incident surface in the transparent tubular encapsulation device and the groove on the light emergent surface in the transparent tubular encapsulation device are shaped like a square.

13. The backlight module of claim 7, further comprising:
at least one optical film, arranged on a top side of the light guide plate.

* * * * *